United States Patent
Leiber et al.

(10) Patent No.: US 6,874,740 B1
(45) Date of Patent: Apr. 5, 2005

(54) USE OF AN ADHESIVE TAPE SECTION

(75) Inventors: Jörn Leiber, Heiligenstedtenerkamp (DE); Bernd Lühmann, Norderstedt (DE); Thomas Raadts, Norderstedt (DE); Ralf Schliephacke, Itzehoe (DE); Peter Kubasch, Lübeck (DE); Jan Chal, Bratislava (CZ); Hansjürgen Linde, Coburg (DE); Uwe Neumann, Coburg (DE); Hans Hazes, Mijdrecht (NL)

(73) Assignee: tesa Aktiengesellschaft, Hamburg (DE)

( * ) Notice: Subject to any disclaimer, the term of this patent is extended or adjusted under 35 U.S.C. 154(b) by 0 days.

(21) Appl. No.: 08/976,820

(22) Filed: Nov. 25, 1997

(30) Foreign Application Priority Data

Dec. 2, 1996 (DE) ......................................... 196 49 636

(51) Int. Cl.⁷ ................................................. C09J 7/02
(52) U.S. Cl. ................... 248/205.3; 428/343; 428/40.1; 428/192
(58) Field of Search ............................. 428/40.1, 41.7, 428/41.8, 192, 201, 343; 248/205.3

(56) References Cited

U.S. PATENT DOCUMENTS 5,491,012 A    2/1996   Lühmann et al. .......... 428/41.6
5,622,761 A *  4/1997   Cole ........................... 428/41.9
5,626,932 A    5/1997   Lühmann et al. ......... 428/40.1
5,725,923 A    3/1998   Lühmann ................... 428/40.1

FOREIGN PATENT DOCUMENTS

| DE | 42 22 849 | 6/1993 |
| DE | 43 39 604 | 5/1995 |
| DE | 44 31 914 | 3/1996 |
| EP | 735121 | 10/1996 |
| WO | 92/11333 | 7/1992 |

* cited by examiner

Primary Examiner—Daniel Zirker
(74) Attorney, Agent, or Firm—Norris McLaughlin & Marcus PA

(57) ABSTRACT

An adhesive tape section having an adhesive region and designed as a polygon having a number of sides and the same number of grip tabs arranged around the adhesive region, or designed as a circle, the adhesive region occupying a central portion of said circle, and a grip tab occupying an outer portion of said circle. The adhesive tape section, when bonded to a substrate, forms a bond with the substrate, which bond is releasable from the substrate by pulling on at least on of said grip tabs in the plane of the bond to stretch the adhesive tape section in the plane of the bond thereby to release the adhesive tape section from the substrate.

14 Claims, 3 Drawing Sheets

USE OF AN ADHESIVE TAPE SECTION

Figure 1:
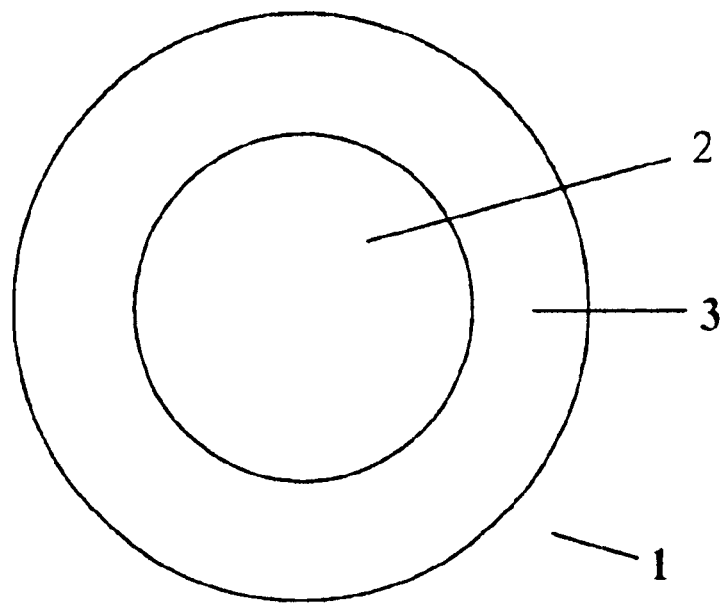

The invention relates to the use of an adhesive tape section for bonds which can be released again without residue or destruction by pulling/stretching in the bond plane.

Highly extensible self-adhesive tapes (adhesive films) which undergo elastic or plastic deformation on stretching and have pressure-sensitive adhesion on one or both sides, and which are redetachable without residue or destruction by pulling essentially in the direction of their bond plane, are known. Bonds produced therewith offer a powerful hold and yet can be detached again without trace and with little or no damage to the substrate or to the adherents. Examples of adhesive tapes of the above-mentioned type are described in U.S. Pat. No. 4,024,312, DE 33 31 016, DE 42 22 849, WO 92/11332, WP 92/11333, U.S. Pat. No. 5,516,581 and WO 95/06691. A common ready-made form of such products is that of self-adhesive tape sections, for example in the form of rectangular strips, which possess a non-tacky grip-tab region at one end (see DE 42 22 849, WO 92/1133 or U.S. Pat. No. 5,516,581). The grip tab serves as a handle for subsequent redetachment of the adhesive tape.

Practical problems with the above-mentioned products occur when, in the case of double-sided self-adhesive tapes with pressure-sensitive adhesion, the self-adhesive tape tears during the detachment process. This problem is addressed in particular by DE 42 22 849, DE 44 28 587 and DE 44 31 914. Adhesive tapes described in DE 42 22 849 use UV-impermeable grip-tab covers which are intended to prevent or reduce the tear propensity in the grip-tab region following UV exposure. Adhesive tapes described in DE 44 28 578 have a specially shaped end which counters partial tearing of the adhesive tape at the end of the detachment process. DE 44 31 914 describes adhesive tapes featuring in the grip-tab region, inter alia, special film or paper covers which are of low adhesion to the self-adhesive composition that is used, thereby reducing the tear propensity in the region of the non-tacky grip tab. Nevertheless, a general solution to the problem of tears is lacking.

A further problem encountered in connection with adhesive tapes which can be redetached by stretching essentially in the bond plane is that the shear force acting on the bond substrate in the course of the detachment process may cause partial damage or destruction of these substrates. DE 44 28 578 in particular addresses this difficulty and provides a solution by specific geometric shaping of the adhesive films at their end. From the standpoint of waste-free production, however, this is often difficult to implement. There is as yet no general solution to the problem described.

A preferred field of use of self-adhesive tapes which are redetachable without residue or destruction by stretching essentially in the bond plane is the bonding of flexible material such as posters, for example, In this context it is frequently the intention, for example for aesthetic reasons, to produce a hidden bond; in other words, the adhesive tape is to remain completely behind the article to be bonded in such a way that, in the bonded state, even the grip tab is not visible. Redetachment requires simple and easy location of the grip tab. In practice, however, it is found that the customer has frequently forgotten how the adhesive tapes were bonded at the time of fixing, and, as a result, where the grip tab is located. It may be the case, through oversight or lack of knowledge, that the self-adhesive tape has also been bonded in such a way that the grip-tab region lies towards the inside of the poster and therefore cannot be reached at all, and so the bond cannot be released again without damaging or destroying the bonded article or the substrate.

The object of the present invention was to overcome the above-mentioned disadvantages and, in particular, to obtain self-adhesive tapes which:

which are redetachable without residue or destruction by stretching essentially in the bond plane, which even in the case of tears can be redetached without residue or destruction during the detachment process, and for which, even in the case of the hidden bonding of flexible materials, the grip tab can be found quickly and easily, and in particular with which faulty bonding of the cut-to-size adhesive-tape sections is impossible.

This object is achieved by the use of adhesive tape sections as characterized in more detail in the claims, especially;

cut-to-size adhesive tape sections which are redetachable without residue or destruction by stretching essentially in the bond plane and which possess grip tabs or grip-tab regions which adjoin a central region of pressure-sensitive adhesion, with grip tabs or grip tab regions projecting in two or more directions from the central region of pressure-sensitive adhesion.

Exemplary applications:

Self-adhesive tapes which can be redetached without residue or destruction for:

the fixing of posters, pictures, calendars, postcards, signs, self-adhesive hooks, including those which are ready-made;

preferably for the bonding of flexible materials so that the grip-tab regions are easy to find, even in the case of hidden bonding, and faulty bonds with, for example, an inaccessible grip-tab region are precluded.

In accordance with the invention it is possible to utilize highly stretchable adhesive tapes which deform elastically or else plastically on extension and which are suitable for bonds which can be redetached without residue or destruction by pulling essentially in the direction of the bond plane, in accordance with, inter alia, U.S. Pat. No. 4,024,312, DE 33 31 016, WO 92/11332, U.S. Pat. No. 5,516,581 and WO 95/06691. Adhesive tapes can feature pressure-sensitive adhesion on one or both sides or else can be provided on one or both sides with a heat-activatable adhesive composition. They may have a single-layer or multilayer construction. In the case of self-adhesive tapes with double-sided pressure-sensitive adhesion it is possible to utilize elastically or plastically deforming materials as the intermediate support. Such materials include not only plastic films but also, in particular, adhesive compositions as intermediate layers and foam-containing intermediate supports.

In the text below the intention is to illustrate the invention with reference to working examples and figures but without thereby wishing unnecessarily to restrict the invention. In the drawings, FIG. 1 shows a plan view of an adhesive tape section according to the invention, while FIGS. 2*a*, 2*b*, 2*c*, 2*d* and FIG. 3 each show plan views of further embodiments.

These FIGS. 1, 2*a–d* and 3 each show adhesive tape sections 1 with adhesive regions 2 and grip tabs or grip-tab regions 3.

Adhesive tapes according to the invention are employed in ready-made form, for instance in the form of punched pieces or cut-to-size sections. Ready-made products have a central region of pressure-sensitive adhesion. Adjacent to this area there are a plurality of—but at least two—grip-tab regions. In one specific embodiment the central region of pressure-sensitive adhesion is surrounded by a continuous peripheral grip-tab region (FIG. 1).

Figure 2A:
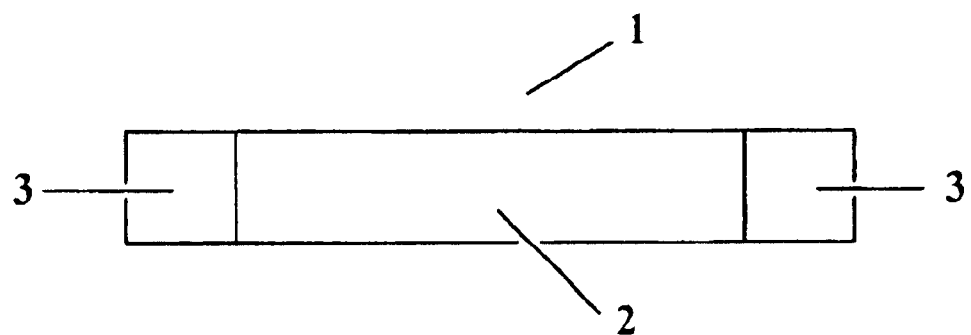
Figure 2B:
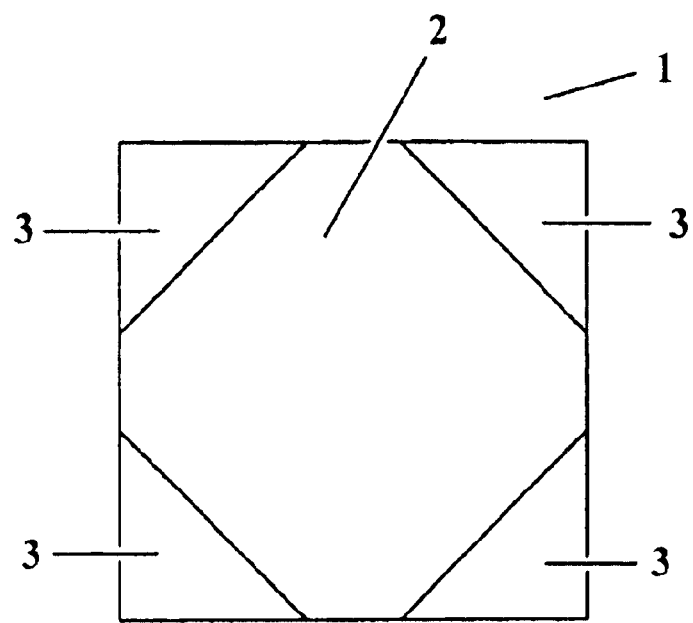
Figure 2C:
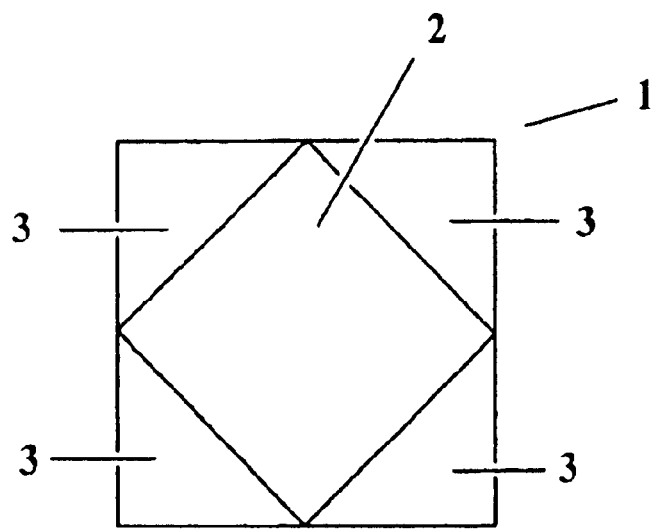
Figure 2D:
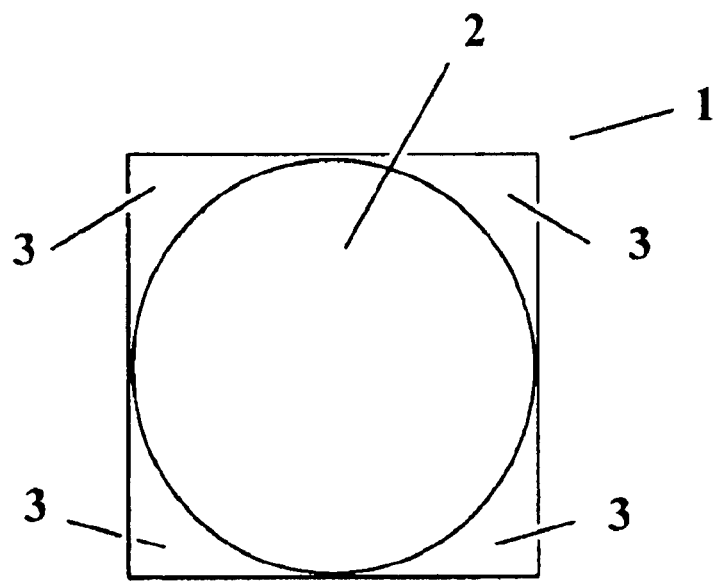

Preferred embodiments are those having two opposing grip-tab regions (FIG. 2a), those having three grip-tab regions at an angle of about 120° and those having four such regions at an angle of about 90° to one another (FIGS. 2b, c, d).

Figure 3:
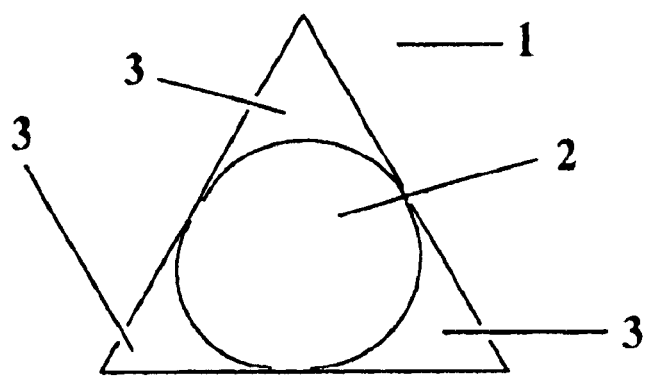

A particularly preferred embodiment is that of an equilateral triangle. The apices of the triangle form three grip-tab regions, with the region of pressure-sensitive adhesion in the center (FIG. 3). The grip-tab regions are designed such that the boundaries to the inner region of pressure-sensitive adhesion extend convexly towards the apices of the triangle. This permits a high bond area relative to the overall surface area of the adhesive-tape section. At the same time, the regions of pressure-sensitive adhesive which lie opposite the apices of the triangle converge to a point. As a result it is possible to utilize the advantages of DE 44 28 578.

All figures should be understood as examples selected from a large number of additional possibilities.

Ready-made forms comprise not only adhesive-tape pieces of defined dimensions, for example in the form of punched pieces or cut-to-size sections as described above, but also adhesive-tape rolls where it is the user who carries out the ultimate cutting of the self-adhesive tape that is to be used, for example by cutting it to size. An example of a corresponding adhesive-tape roll is that of a double-sided pressure-sensitive adhesive tape which is covered, for example, with release paper and whose pressure-sensitive adhesive composition surface in both marginal regions is neutralized on both sides by, for example, application of a thin polyester film. Simple cutting to size of such a roll gives sections corresponding to FIG. 2a.

Adhesive tapes according to the invention can be obtained, starting from single or double-sided pressure-sensitive self-adhesive tapes which can be redetached without residue or destruction by stretching essentially in the direction of the bond plane, by partial neutralization of the pressure-sensitive adhesive surface of these adhesive tapes.

The surface of the adhesive composition can be neutralized by covering it with, for example, thin films of, for example, plastic or by covering with thin sheets of paper. Alternatively, coating or printing of the regions of pressure-sensitive adhesive composition which are to be neutralized can be carried out by means of a non-tacky coating material or of a non-tacky powder material. Neutralization is preferably achieved in accordance with DE 44 31 914.

An alternative possibility is to obtain self-adhesive tapes according to the invention by a selective coating of suitable support materials which do not feature pressure-sensitive adhesion. In this case, the grip-tab regions are provided by the support utilized, which has been coated or printed partially with adhesive composition in such a way that the grip-tab regions are not covered with adhesive.

Preferably, the neutralization of the surface of the adhesive composition, and the coating of a suitable support with pressure-sensitive adhesive composition, takes place so as to be approximately coincident on both sides in the case of double-sided pressure-sensitive adhesive films.

EXAMPLES

Example 1

12 μm thick polyethylene terephthalate film sections (Hostaphan RN 12) siliconized on one side and measuring 15 mm×15 mm are put with the siliconized side facing the adhesive onto both sides, at both longitudinal ends, of a single-layer adhesive film measuring 70 mm×15 mm×1 mm (length×width×thickness) based on a styrene block copolymer (formulation 1). To protect the central regions, featuring pressure-sensitive adhesion, of the resulting adhesive films, they are covered on both sides with siliconized release paper. Four such adhesive film sections are used to fix a poster on to a wall covered with painted ingrain wallpaper (wallpaper: Erfurt Körnung 52; color: Herbol Zenit LG; wallpaper bonded onto chipboard). For this purpose the release papers are removed from one side of the adhesive films, and then the adhesive films fre d from the release paper on one side are fixed with their pressure-sensitive adhesive side into the four corner regions of the reverse side of the poster in such a way that hidden bonding of the poster can be performed. In a second step, the rear-side release paper of the adhesive films are peeled off and the poster is bonded. To redetach the posters, careful folding forwards of the poster corners in all cases reveals a grip tab whereby simple detachment is possible. Faulty bonding as is possible in the case of adhesive films provided on only one side with a grip tab, if the grip tabs are bonded pointing towards the center of the poster, is not possible.

Formulation 1
80 parts of Europene Sol T 193B (Enichem)
20 parts of Vector 4261 (Exxon Chemicals)
100 parts of Foralyn 110 (Hercules)
1 part of Irganox 1010 (Ciba)

Example 1a

In accordance with Example 1, a foam-containing support based on an ethylene-vinyl acetate copolymer (Alveolit TEE 0500.8; Alveo AG; density=200 kg/m$^3$; thickness=800 μm) is laminated together on both sides with a 250 μm thick adhesive film of formulation 1. For this purpose the chosen foam is placed on the pressure-sensitive adhesive, which is present on siliconized release paper, and then a rubber-coated steel roller with a width of 25 cm is rolled over the assembly five times with a pressure of 50 N. The resulting semi-finished product is coated with pressure-sensitive adhesive in an identical manner on the second side. Then, in a manner similar to that of Example 1, adhesive film sections are produced which carry on both sides, at the end, grip tabs comprising 15 mm×15 mm polyester films which have been siliconized on one side. Bonds are formed after the resulting samples have been conditioned for 24 hours in a controlled-climate chamber (50% relative humidity, T=RT=23° C.). Four of the adhesive film strips are used as in Example 1 to bond a poster to painted ingrain wallpaper. When the adhesive film strips are slowly detached it is observed that at the end of the detachment process, when the maximum shear stress is exerted on the substrate, a small amount of paint is torn away from the surface of the painted ingrain wallpaper. If, on the other hand, both grip tabs are gripped simultaneously and are pulled apart diametrically in the direction of the grip tabs and essentially in the bond plane, then a substantially smaller part of the detachment force acts on the painted ingrain wallpaper. Correspondingly, detachment totally without destruction is demonstrated.

Example 2

Circular single-layer adhesive-film punched sections 1 mm thick (adhesive composition corresponding to formulation 1) and with a diameter of 60 mm are made non-tacky on both sides in a marginal region of 20 mm by powdering with titanium dioxide (Kronos 2210) in accordance with FIG. 1. In accordance with Example 1, a poster is bonded. The substrate employed is a smooth Resopal-coated chipboard panel. Owing to the circular grip-tab region if it is possible to find the grip-tab for the detachment process immediately. Faulty bonding as is possible in the case of adhesive films provided on only one side with a grip tab, if the grip tabs are bonded pointing towards the center of the poster, is not possible.

Example 3

Adhesive film sections in the shape of equilateral triangles with an edge length of 60 mm and a thickness of 1 mm (adhesive composition corresponding to formulation 1) are covered so as to be coincident on both sides, in accordance with Example 1, with 12 μm thick polyester film which has been siliconized on one side. The central regions, featuring pressure-sensitive adhesion, of the resulting adhesive films are protected by being covered on both sides with siliconized release paper. Owing to the convergence to a point of the regions of pressure-sensitive adhesive which are opposite to the grip tabs, the adhesive film sections obtained in this way are particularly suitable for non-destructive redetachment even from highly sensitive substrates.

Even if a grip tab tears (as a result, for example, of very rapid stretching of the adhesive films, starting from a grip tab which is griped only at its very end), non-destructive detachment is possible by way of one of the two remaining grip tabs.

What is claimed is:

1. An adhesive tape section comprising an adhesive region and a plurality of grip tabs, said adhesive tape section being designed as a polygon having a number of sides and the same number of grip tabs, wherein the adhesive tape section, when bonded to a substrate, forms a bond with said substrate, which bond is releasable from said substrate by pulling on at least one of said grip tabs in the plane of said bond to stretch said adhesive tape section in the plane of said bond thereby to release said adhesive tape section from said substrate.

2. The adhesive tape section according to claim 1, which is designed as a triangle, and comprises three grip tabs, and one of said grip tabs is arranged in each of the angles of said triangle.

3. The adhesive tap section according to claim 1, which is designed as a quadrangle, and comprises four grip tabs, and one of said grip tabs is arranged in each of the angles of said quadrangle.

4. The adhesive tape section according to claim 1, which is self-adhesive on both faces thereof.

5. The adhesive tape section according to claim 1, which comprises a highly stretchable material that can be deformed elastically or plastically on extension, with or without an intermediate support.

6. The adhesive tape section according to claim 1, wherein the grip tabs are arranged around the adhesive region.

7. The adhesive tape section according to claim 1, wherein the grip tabs are arranged symmetrically about the adhesive tape section.

8. The adhesive tape section comprising an adhesive region and a grip tab, said adhesive tape section being designed as a circle, the adhesive region occupying a central portion of said circle, said grip tab occupying an outer portion of said circle, and said grip tab surrounding said adhesive region, wherein the adhesive tape section, when bonded to a substrate, forms a bond with said substrate, which bond is releasable from said substrate by pulling said grip tab in the plane of said bond to stretch said adhesive tape section in the plane of said bond thereby to release said adhesive tape section from said substrate.

9. The adhesive tape section according to claim 8 which is self-adhesive on both faces thereof.

10. The adhesive tape section according to claim 8, which comprises a highly stretchable material that can be deformed elastically or plastically on extension, with or without an intermediate support.

11. The adhesive tape section according to claim 8, wherein the grip tab is arranged symmetrically about the adhesive tape section.

12. A method of forming a bond between an adhesive tape section and a substrate, and thereafter releasing said adhesive tape section from said substrate without leaving a residue on said substrate or destroying the substrate, said method comprising providing an adhesive tape section according to any one of claims 1–11, forming a bond between said adhesive tape section and said substrate, and thereafter releasing said adhesive tape section from said substrate without leaving a residue on said substrate or destroying the substrate by pulling on at least one of said grip tabs in the plane of said bond to stretch said adhesive tape section in the plane of said bond thereby to release said adhesive tape section from said substrate without leaving a residue on said substrate or destroying the substrate.

13. A method of forming a bond between an adhesive tape section and a substrate, and thereafter releasing said adhesive tape section from said substrate without leaving a residue on said substrate or destroying the substrate, said method comprising:

A. providing an adhesive tape section according to claim 1,

B. forming a bond between said adhesive tape section and said substrate, and

C. releasing said adhesive tape section from said substrate without leaving a residue on said substrate or destroying the substrate by simultaneously pulling at least two grip tabs in the plane of said bond to stretch said adhesive tape section in the plane of said bond thereby to release said adhesive tape section from said substrate without leaving residue on said substrate or destroying said substrate.

14. The method according to claim 13 wherein Step C further comprises simultaneously pulling the at least two grip tabs apart diametrically in the plane of said bond to stretch said adhesive tape section in the plane of said bond thereby to release said adhesive tape section from said substrate without leaving a residue on said substrate or destroying said substrate.

* * * * *

UNITED STATES PATENT AND TRADEMARK OFFICE
CERTIFICATE OF CORRECTION

PATENT NO. : 6,874,740 B1  Page 1 of 1
APPLICATION NO. : 08/976820
DATED : April 5, 2005
INVENTOR(S) : Leiber et al.

It is certified that error appears in the above-identified patent and that said Letters Patent is hereby corrected as shown below:

Title Page Item [57]
Abstract, Line 9, "on of said grip tabs" should read -- one of said grip tabs --

Column 4, Line 13, "fre d from" should read -- freed from --

Column 5, Line 28, "griped only" should read -- gripped only --

Column 5, Line 46, "adhesive tap" should read -- adhesive tape --

Signed and Sealed this

Third Day of April, 2007

JON W. DUDAS
*Director of the United States Patent and Trademark Office*